United States Patent
MacLachlan

(10) Patent No.: US 8,028,823 B2
(45) Date of Patent: Oct. 4, 2011

(54) STACKED ATTACHMENTS FOR MODULAR CONVEYOR BELTS

(75) Inventor: Gilbert J. MacLachlan, Harahan, LA (US)

(73) Assignee: Laitram, L.L.C., Harahan, LA (US)

(*) Notice: Subject to any disclaimer, the term of this patent is extended or adjusted under 35 U.S.C. 154(b) by 680 days.

(21) Appl. No.: 11/678,159

(22) Filed: Feb. 23, 2007

(65) Prior Publication Data

US 2008/0202896 A1 Aug. 28, 2008

(51) Int. Cl.
*B65G 15/00* (2006.01)

(52) U.S. Cl. .............. 198/711; 198/836.4; 198/853

(58) Field of Classification Search ........... 198/711, 198/712, 836.4, 853
See application file for complete search history.

(56) References Cited

U.S. PATENT DOCUMENTS

| 4,317,514 | A | * | 3/1982 | Noren ............... 198/803.13 |
| 4,832,183 | A | | 5/1989 | Lapeyre |
| 5,074,406 | A | | 12/1991 | Gundlach et al. |
| 5,165,514 | A | | 11/1992 | Faulkner |
| 5,469,956 | A | | 11/1995 | Greve et al. |
| 5,497,874 | A | | 3/1996 | Layne |
| 6,050,397 | A | * | 4/2000 | Kato et al. ............ 198/853 |
| 6,467,610 | B1 | | 10/2002 | MacLachlan |
| 6,554,129 | B2 | | 4/2003 | Straight et al. |
| 6,695,135 | B1 | * | 2/2004 | Lapeyre ............. 198/853 |
| 6,827,204 | B2 | * | 12/2004 | Cribiu' ............. 198/844.1 |
| 7,048,850 | B2 | | 5/2006 | DePaso et al. |
| 2006/0185967 | A1 | * | 8/2006 | Sedlacek et al. ....... 198/853 |

* cited by examiner

*Primary Examiner* — Kavel Singh
(74) *Attorney, Agent, or Firm* — James T. Cronrich

(57) ABSTRACT

A detachable stacked attachment for a modular conveyor belt. An attachment, for example, a bucket, comprises a group of components arranged side by side in an aligned stack of parallel layers. Interior components are sandwiched between outermost and end components. The number and widths of the components in the stack define the width of the resulting stack attachment. In this way, an attachment of selected width may be attached to a conveyor belt.

12 Claims, 5 Drawing Sheets

US 8,028,823 B2

STACKED ATTACHMENTS FOR MODULAR CONVEYOR BELTS

BACKGROUND

The invention relates generally to power-driven conveyor belts and, more particularly, to modular conveyor belt attachments formed of stacked layers of components.

Generally flat conveyor belts often include appurtenances to meet special conveying applications. Flights, buckets, or scoops may be added to a conveyor belt to help convey articles, liquids, or aggregates up inclines. These appurtenances may be integrally molded with the belt or belt modules or may be separate pieces that are attached to the belt. If the topology of a plastic belt module with an appurtenance makes it difficult to mold a unitary part, the appurtenance can be molded separately and attached to the conveyor belt. But some appurtenances, themselves, may have topologies that make molding difficult. For example, a part that includes closed ends and undercut portions may be difficult to mold. Furthermore, whether molded integrally with a belt module or separately, an appurtenance with fixed dimensions may not optimally suit some applications.

SUMMARY

These and other shortcomings are overcome by a conveyor embodying features of the invention. In one aspect, the conveyor comprises a modular conveyor belt and an attachment of selected width. The attachment is made up of individual-width components arranged side-by-side in an aligned stack of parallel layers. At least one of the components in the stack includes connecting structure for connecting the attachment to the modular conveyor belt outward of an outer face of the belt.

In another aspect of the invention, an attachment for a modular conveyor comprises a plurality of components, each having an individual width, arranged side by side in an aligned stack of parallel layers. Means for joining hold the layers together to form a stack of selected width. At least one of the components in the stack includes connecting structure connecting the attachment to the modular conveyor belt.

In another aspect of the invention, a method for assembling a modular conveyor belt attachment of selected width comprises: (a) arranging a series of conveyor belt attachment components having individual widths side by side in an aligned stack of parallel layers having a selected width; and (b) joining the stack of components together to form the attachment before attaching it to a conveyor belt.

BRIEF DESCRIPTION OF THE DRAWINGS

These aspects and features of the invention, as well as its advantages, are better understood by referring to the following description, appended claims, and accompanying drawings, in which:

DETAILED DESCRIPTION

Figure 1:
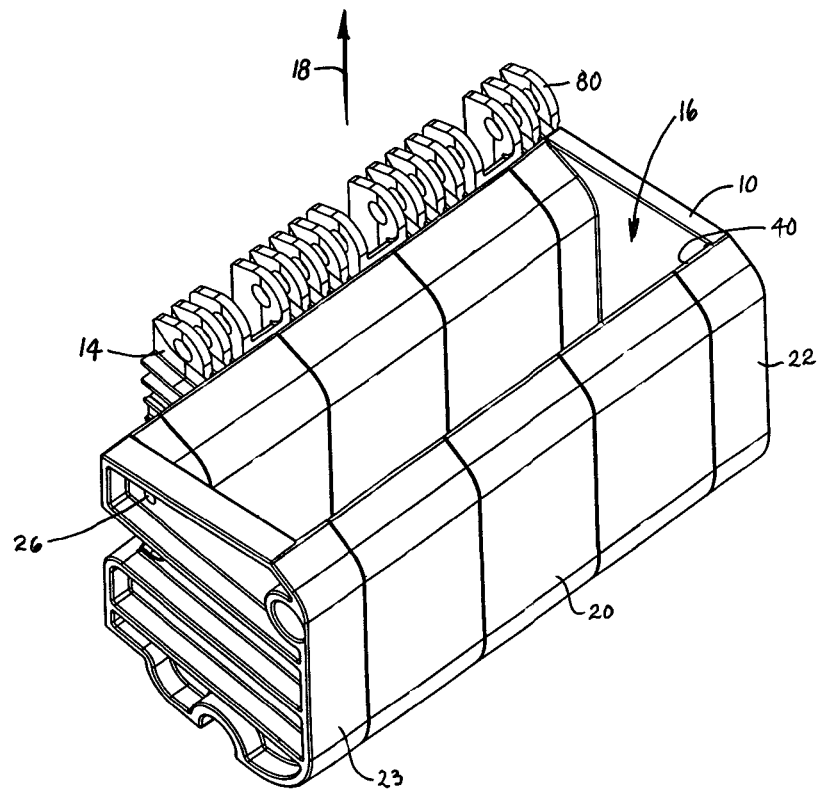
FIG. 1 is isometric view of an exemplary version of a stacked attachment embodying features of the invention.
Figure 2:
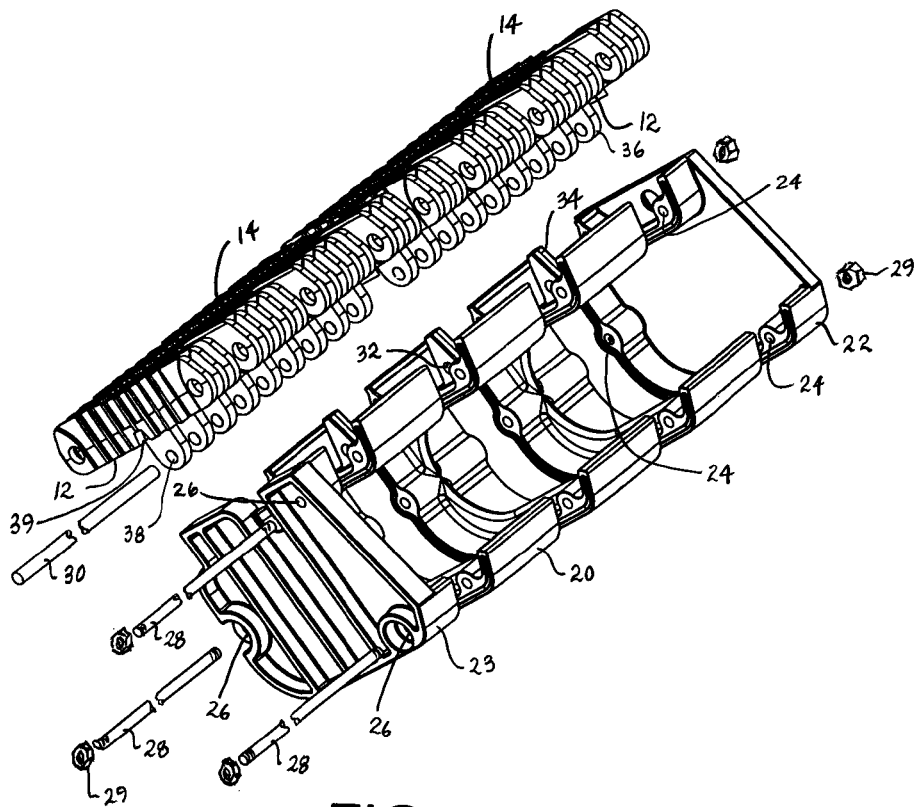
FIG. 2 is an exploded isometric view of the stacked attachment of FIG. 1 showing its attachment to conveyor belt modules.

A stacked attachment embodying features of the invention is shown in FIGS. 1 and 2. The attachment shown is a bucket 10 that is attached to an outer face 12 of one or more conveyor belt modules 14. The bucket is generally a rectangular prism closed on five of its six sides. Its open side forms a mouth 16 through which articles to be elevated enter the bucket. The conveyor belt advances in a direction of belt travel 18 with the mouth of the bucket leading.

The bucket is constructed of a collection of components, such as interior components 20, right-end components 22, and left-end components 23. Each component is preferably individually molded out of a thermoplastic polymer, such as polyethylene, polypropylene, or nylon. The topology of the full bucket with its closed sides and an overhanging lip along its open mouth makes the bucket difficult to mold as a unitary piece. That's why the bucket is suited to a stacked construction. Each component in the bucket forms an individual layer of a stack, with the interior layers sandwiched in parallel between the outermost end layers. Each component has an individual width, which may be the same as or different from the widths of the other components. In this example, the interior components 20 all have the same width, and the outermost components 22, 23 have the same width. The width of the outermost components is less than the width of the interior components. A bucket of a selected width can be made by stacking any number of these components of individual widths side by side to form the stack.

As shown in FIG. 2, each of the components has three bores 24. Each bore aligns with similar bores in the other components in the stack. The three sets of aligned bores form lateral passageways 26 extending through the stacked layers. Rods 28 are received in the passageways. The rods may be bolts or threaded at each end for nuts 29, which act as tighteners to hold the layers together in alignment. Thus, the aligned bores in the stack, together with the rod and its tighteners, constitute means for joining the layers together.

The stacked bucket 10 is attached to one or more belt modules 14 by a connecting pin 30. At least some of the components have an opening 32 formed in connecting structure 34. In this example, the connecting structure forms a trapezoidal tooth that extends from the bucket's side that mounts to the outer face 12 of the modular belt. Upstanding supports 36 are spaced apart across the width of the belt modules. Openings 38 in the supports are aligned with the openings in the bucket's teeth when the bucket is in position on the belt. The connecting pin 30 extends through the aligned openings to hold the bucket attachment firmly to the belt. The attachment may be readily detached for replacement by removing the connecting pin. Receptacles 39 in the outer face of the belt modules receive the ends of the teeth to stabilize the attached bucket.

As shown in FIG. 1, the selected width of the bucket exceeds the width of the belt module depicted, but the width of the bucket may be selected to be equal to or less than the width of the module. As shown in FIG. 2, the bucket is attached to two side-by-side belt modules. As is also shown, the individual widths of the components forming the layers of the bucket are less than the widths of the belt modules to which they are mounted.

Figure 3A:
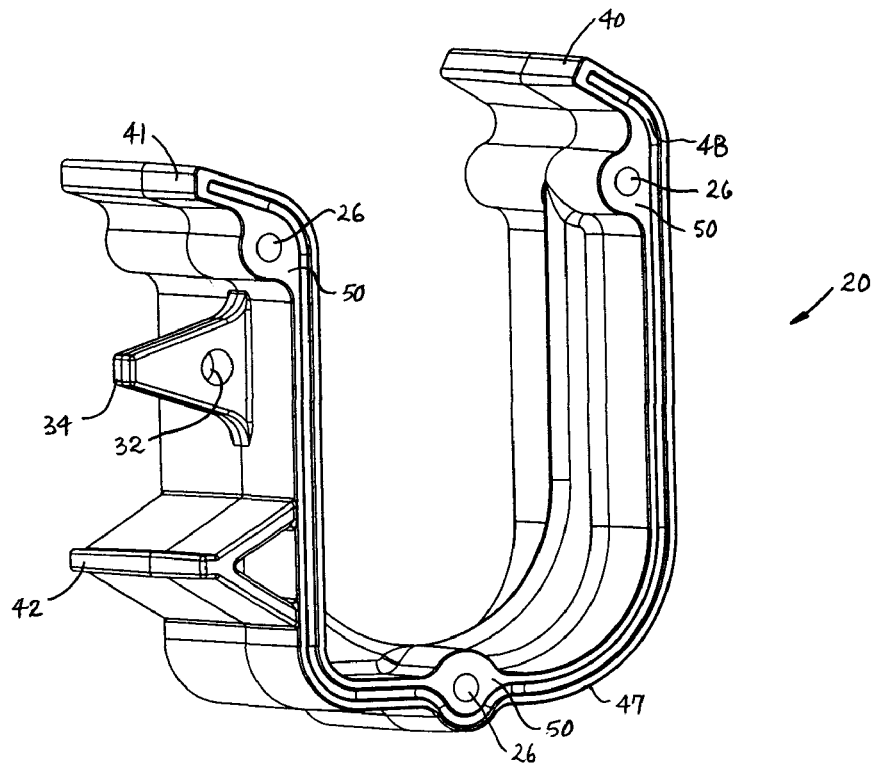
FIGS. 3A and 3B are oblique views of each side of an interior component of the stacked attachment in FIG. 1.
Figure 3B:
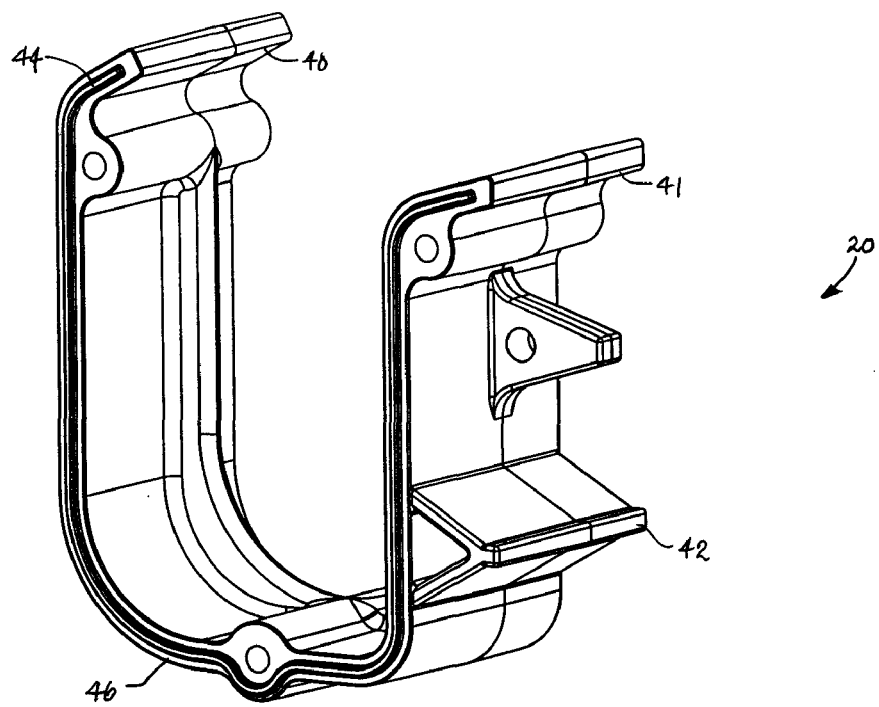

The features of the interior components 20 of the bucket are shown in FIGS. 3A and 3B. The components are C-shaped with lips 40, 41 at the ends of the C. The outer lip 40 extends over the mouth of the C. The inner lip 41 extends away from the mouth and serves as a leg that rests on the outer face of the belt and helps support the bucket. Also extending from the interior component's inner side is another supporting leg 42. Between the lip and the Y-shaped leg is the tooth 34 with its mounting openings 32. A rib, or bead 44, runs the majority of the length of the right-side edge 46 of the component. The bead mates with a complementary groove 48 recessed into the left-side edge 47 of the component. This bead-and-groove arrangement helps further align the layers in the stack and make the bucket watertight. The bores 26 extend through reinforcing bosses 50.

Figure 4A:
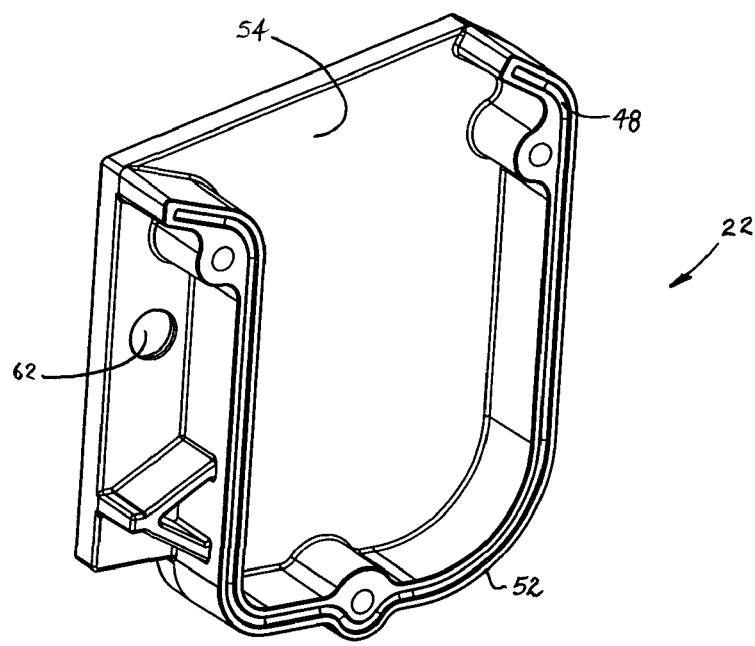
FIGS. 4A and 4B are oblique views of both sides of one of the outermost components of the stacked attachment in FIG. 1.
Figure 4B:
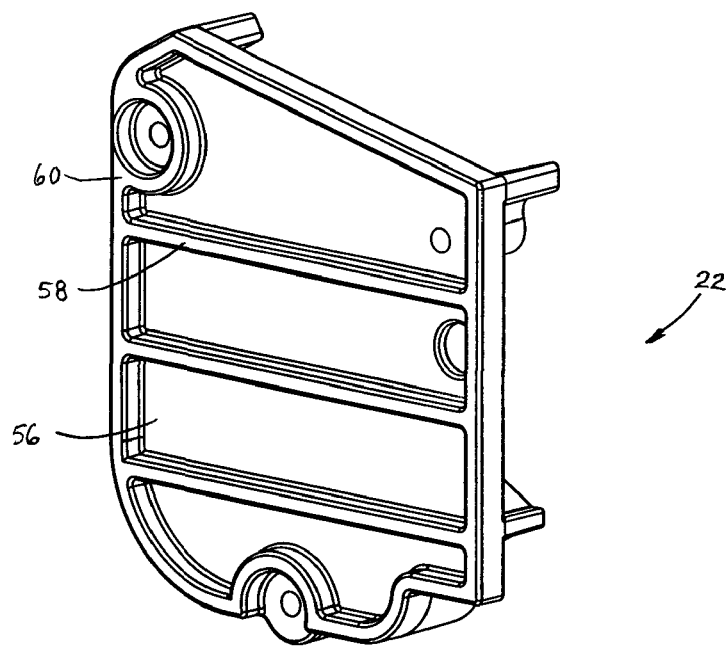

The outermost component 22 shown in FIGS. 4A and 4B forms the right-side closed end of the bucket. The inner edge 52 of the right-end component has a groove 48, which is like the groove in the edge of the interior components in that it is sized to receive the bead of an adjacent interior component. An end plate 54 forms the closed end of the bucket. Except for the end plate and the absence of connecting structure on the right-side component, the cross section of the component in a plane parallel to the end plate is generally identical to that of the interior component of FIGS. 3A and 3B. The outer face 56 of the right-side end component has strengthening ribs 58 extending between a raised rim 60 forming the perimeter of the end component's outer face. An aperture 62 through the end plate admits the connecting pin.

Figure 5A:
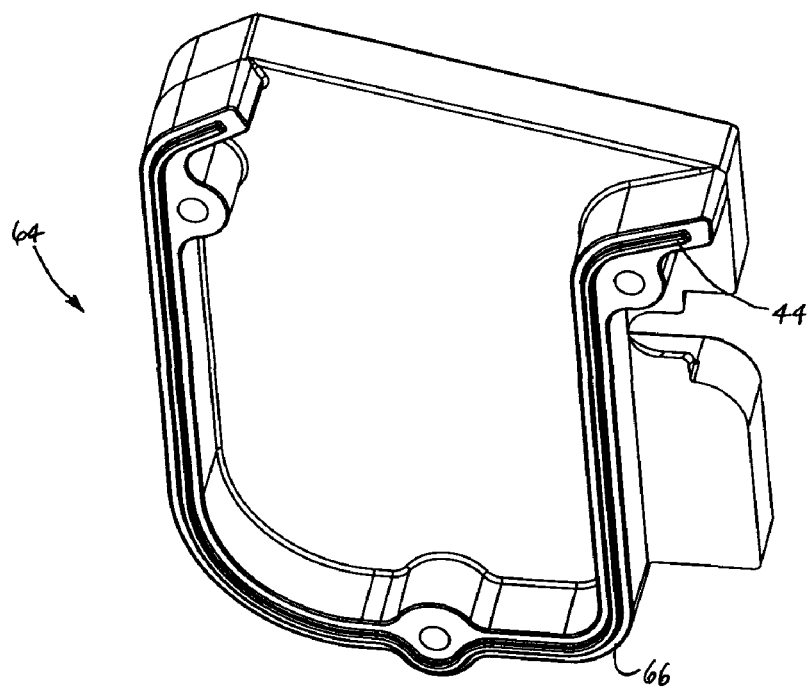
FIGS. 5A and 5B are oblique views of both sides of the other outermost component in the stacked attachment of FIG. 1.
Figure 5B:
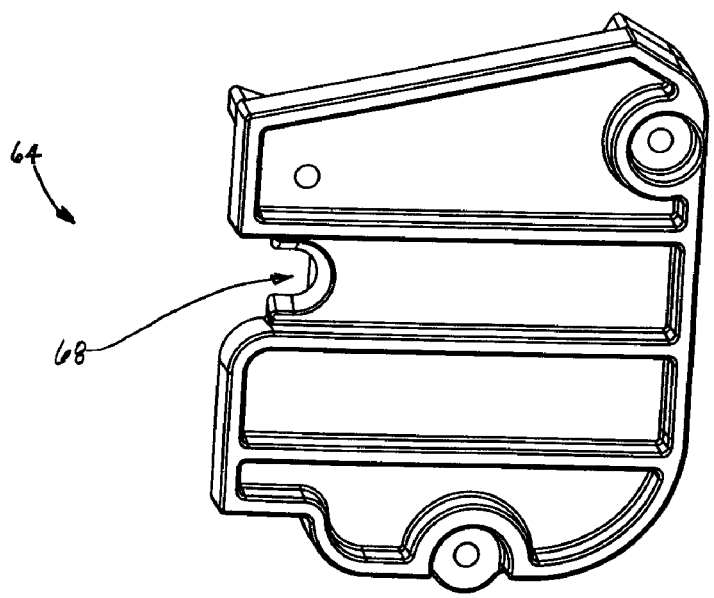

The left-side outermost component 64 is shown in FIGS. 5A and 5B. This component is similar to the opposite closed-end component, except that it includes a bead 44 instead of a groove along its inner edge 66. Furthermore, instead of having a circular aperture as the right-side component has, the left-side component has an open slot 68 to admit the connecting rod into the connecting structure.

Figure 6:
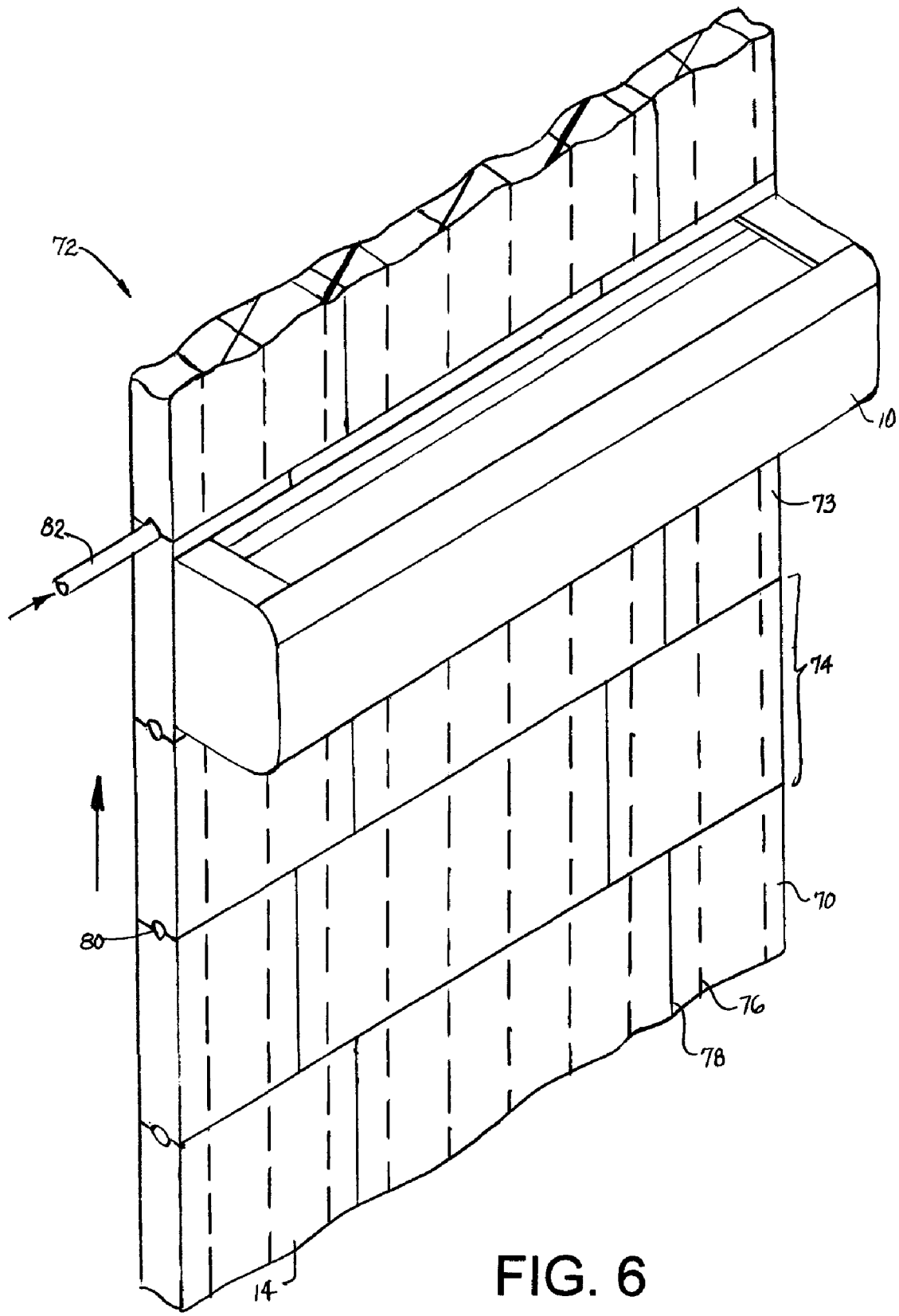
FIG. 6 is an isometric view of a modular belt conveyor with a stacked attachment as in FIG. 1.

A modular conveyor belt 70 having a stacked bucket attachment 10 is shown in a vertical conveyor 72 in FIG. 6. The vertical conveyor may be used as a vertical traveling water screen, for example. The bucket in such an application may be used to lift fish and other aquatic life away from danger in front of a cooling water or turbine intake. The bucket is connected into the belt as shown in FIG. 2 and extends outward of the belt's outer face 73. The conveyor belt is constructed of a series of rows 74 of one or more belt modules 14 like those in FIGS. 1 and 2. The belt modules preferably include perforations 76 extending through the belt's thickness to allow water to flow through. The modules are arranged side by side in each row with seams 78 between adjacent modules in each row. The modules are also preferably laid out in a bricklay pattern for strength. Hinge eyes (80, in FIG. 1) along leading and trailing ends of a row are interleaved with the hinge eyes along an abutting end of an adjacent row. A hinge rod 82 inserted in the aligned hinge eyes connects adjacent belt rows together at a hinge joint that allows the rows to articulate. The stacked construction of the bucket allows it to be built to a range of widths to meet specific requirements. The bucket attachment may fit on a single module or may span the seam between adjacent modules to which it connects.

Although the invention has been described in detail with reference to a preferred version, other versions are possible. Beside buckets, other attachments that could be constructed in layers include, for example: straight flights, perforated flights, ribbed flights, and curved or bent flights or scoops. As another example, the interior layers can be molded in different widths, with or without connecting structure, to allow attachments of a wide variety of widths to be built. The connecting structure shown represents one example. Other examples include two connecting pins through offset aligned holes and connecting structure that hooks into the belt structure. So, as these few examples suggest, the scope and spirit of the invention is not meant to be limited to the versions described in detail.

What is claimed is:

1. A conveyor comprising:
   a modular conveyor belt having an outer face;
   an attachment of selected width including a plurality of components, each having an individual width, arranged side by side in an aligned stack of parallel layers to form the attachment of selected width;
   wherein at least one of the components in the stack includes connecting structure for detachably connecting the attachment to the modular conveyor belt so that the attachment mounts to the outer face of the modular conveyor belt wherein the components in the aligned stack have aligned bores forming a passageway through the stack to admit a rod for maintaining the stack alignment.

2. A conveyor as in claim 1 wherein at least two of the components have different widths.

3. A conveyor as in claim 1 wherein the modular conveyor belt comprises a series of rows of multiple belt modules separated in a row by seams between adjacent modules and wherein the attachment spans at least one of the seams.

4. A conveyor as in claim 3 wherein the individual widths of the components are less than the widths of the belt modules.

5. A conveyor as in claim 1 wherein the attachment forms a bucket extending outward from the outer face of the modular conveyor belt.

6. A conveyor as in claim 1 wherein at least some of the components are generally C-shaped.

7. A conveyor as in claim 6 wherein the C-shaped components have lips extending generally in the same direction from each end of the C.

8. A conveyor as in claim 1 wherein the modular conveyor belt has upstanding supports spaced apart across the width of the outer face of the conveyor belt with an opening therethrough and wherein the connecting structure has openings that align with the openings in the supports and further comprising a connecting pin received in the aligned openings to connect the attachment to the modular conveyor belt.

9. A conveyor as in claim 1 wherein the connecting structure includes a tooth and wherein the modular conveyor belt includes a receptacle opening onto the outer face for receiving the tooth.

10. A conveyor as in claim 1 wherein at least one of the components includes a leg that rests on the outer face of the conveyor belt when the attachment is attached to the belt.

11. A conveyor as in claim 1 wherein components forming interior layers have opposite first and second edges in contact with the second and first edges of adjacent components in the stack and wherein the first edges have a bead running along the length of the first edge and wherein the second edges have a groove running along the length of the second edge and receiving the bead in the first edge of the adjacent component.

12. A conveyor as in claim 1 wherein the components forming the outermost layers in the stack differ from the components forming the interior layers of the stack.

* * * * *